(12) United States Patent
Kim

(10) Patent No.: US 8,932,041 B2
(45) Date of Patent: Jan. 13, 2015

(54) MOLD STRUCTURE, PATTERNING METHOD USING THE SAME, AND METHOD OF FABRICATING LIQUID CRYSTAL DISPLAY DEVICE

(75) Inventor: Jin Wuk Kim, Uiwang-si (KR)

(73) Assignee: LG Display Co., Ltd., Seoul (KR)

( * ) Notice: Subject to any disclaimer, the term of this patent is extended or adjusted under 35 U.S.C. 154(b) by 853 days.

(21) Appl. No.: 11/966,571

(22) Filed: Dec. 28, 2007

(65) Prior Publication Data

US 2008/0157414 A1 Jul. 3, 2008

(30) Foreign Application Priority Data

Dec. 29, 2006 (KR) .......................... 10-2006-138220

(51) Int. Cl.
*B29C 33/38* (2006.01)

(52) U.S. Cl.
USPC ....... 425/174.4; 249/134; 264/1.36; 264/484; 425/175

(58) Field of Classification Search
USPC ......... 249/78, 116, 134, 135; 425/174.4, 175, 425/406; 264/402, 320, 322, 1.36, 484
See application file for complete search history.

(56) References Cited

U.S. PATENT DOCUMENTS

| | | | | |
|---|---|---|---|---|
| 2001/0035716 A1* | 11/2001 | Murasko | ....................... | 313/510 |
| 2004/0036201 A1* | 2/2004 | Chou et al. | ..................... | 264/402 |
| 2005/0037143 A1 | 2/2005 | Chou et al. | | |
| 2005/0139576 A1* | 6/2005 | Kim | ................................ | 216/23 |
| 2006/0281204 A1* | 12/2006 | Chang et al. | .................... | 438/22 |
| 2007/0246441 A1* | 10/2007 | Kim et al. | ....................... | 216/41 |
| 2008/0217822 A1* | 9/2008 | Chou et al. | .................... | 264/496 |

FOREIGN PATENT DOCUMENTS

| | | |
|---|---|---|
| CN | 1637614 A | 7/2005 |
| CN | 1678443 A | 10/2005 |
| KR | 1020050067244 A | 7/2005 |
| KR | 1020060044263 A | 5/2006 |

OTHER PUBLICATIONS

Office Action issued in corresponding Chinese Patent Application No. 200710196342.5, mailed May 11, 2011.
Office Action issued in corresponding Taiwan Patent Application No. 096148196, mailed Feb. 23, 2012.
Office Action issued in corresponding Korean Patent Application No. 10-2006-0138220, mailed Feb. 21, 2013.

* cited by examiner

*Primary Examiner* — Mathieu D. Vargot
(74) *Attorney, Agent, or Firm* — Brinks Gilson & Lione

(57) ABSTRACT

A mold structure, a patterning method thereof and a method of fabricating an LCD device using the same are disclosed, which can realize a conformal contact by applying a voltage between a mold structure and a material layer being opposite to each other in an In-Plane Printing process, so as to prevent defective patterns, wherein the mold structure comprises a mold whose surface is provided with patterns; a backplane for supporting the mold; and a conductive film formed between the backplane and the mold.

3 Claims, 9 Drawing Sheets

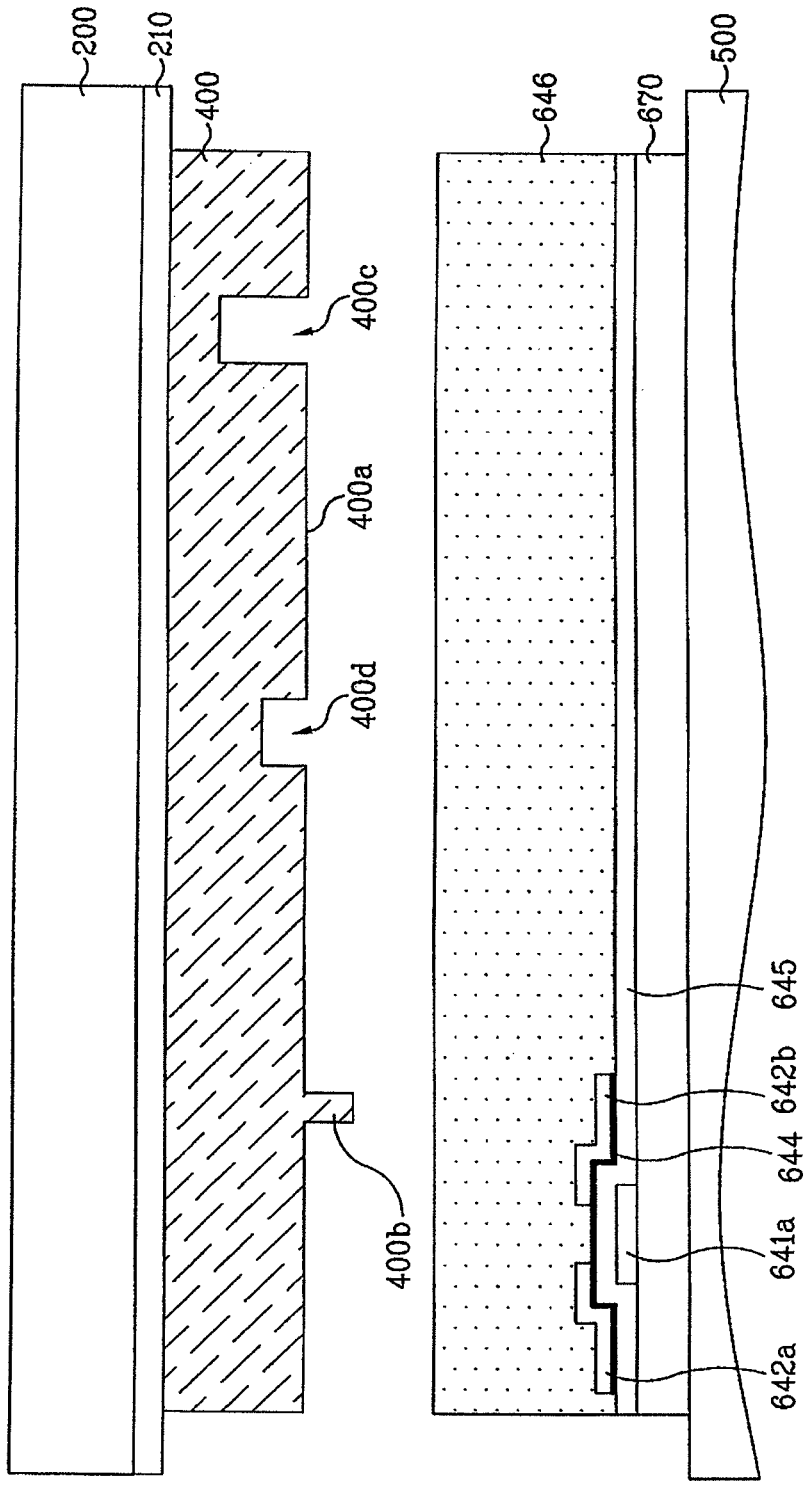

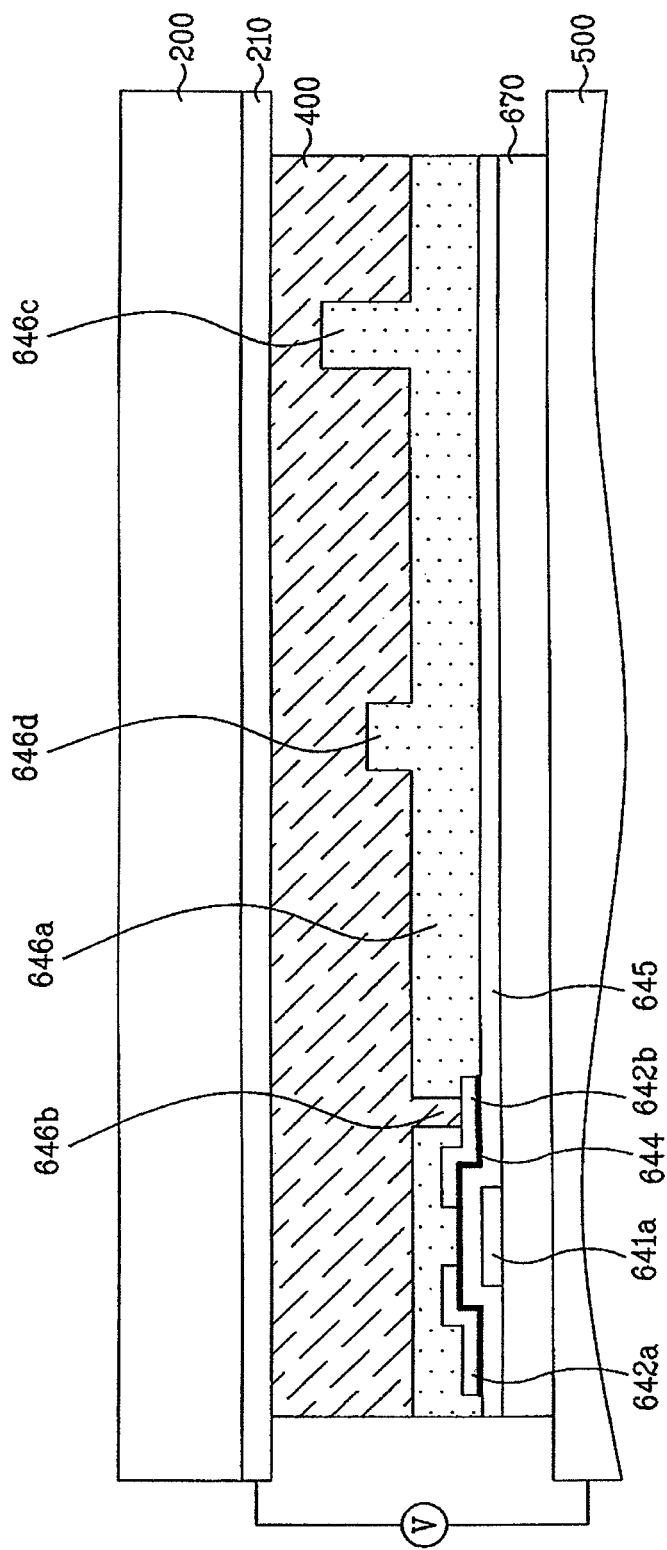

MOLD STRUCTURE, PATTERNING METHOD USING THE SAME, AND METHOD OF FABRICATING LIQUID CRYSTAL DISPLAY DEVICE

CLAIM FOR PRIORITY

This application claims the benefit of Korean Patent Application No. 2006-138220 filed on Dec. 29, 2006, which is hereby incorporated by reference as if fully set forth herein.

BACKGROUND OF THE INVENTION

1. Field of the Invention

Embodiments of the present invention relate to a patterning method, and more particularly, to a mold structure which can realize a conformal contact by applying a voltage between a mold structure and a material layer positioned in opposite to each other, so as to prevent defective patterns, and a patterning method using the aforementioned mold structure and a method of fabricating an LCD device with the aforementioned mold structure.

2. Discussion of the Related Art

A fine-pattern formation process, for example, a process for forming an electric circuit is an important element which can determine the efficiency and capacity of device as well as a main element which can affect the properties of device.

Recently, there have been various efforts to improve the efficiency and capacity of device, and more particularly, studies and researches in relation with the formation of fine pattern so as to improve the efficiency and capacity of device.

The fine-pattern formation process is necessary for flat panel display devices such as a printed circuit board (PCB), a liquid crystal display device (LCD), and a plasma display panel (PDP).

Various studies for formation of the pattern have been made, especially, a photolithography process using a photoresist is most generally used, which will be described as follows.

First, a photoresist layer having photosensitivity is coated on a metal layer, wherein the metal layer is formed on a substrate of a semiconductor material or an insulation material such as glass.

Then, a soft baking process is applied to the photoresist layer.

After an exposure mask having a light-transmission region and a light-shielding region defined therein is positioned above the photoresist layer, UV rays are applied to the photoresist layer through the exposure mask. Generally, the photoresist may be classified into a positive type and a negative type. For convenience of explanation, the case using the negative type photoresist will be explained.

If UV rays are irradiated to predetermined portions of the negative type photoresist, the predetermined portions of the negative type photoresist, which are irradiated with the UV rays, are changed on their chemical structure.

Then, if the negative type photoresist is dipped into a vessel filled with a developer, a photoresist pattern is formed by removing the remaining portions of the negative type photoresist which are not irradiated with the UV rays.

Subsequently, after blocking some of a metal layer with the photoresist pattern, it is dipped into the developer. Then, a hard baking process is applied thereto, and then the metal layer except the portion below the photoresist pattern is etched to thereby form a metal pattern.

According as the photoresist pattern is removed by a stripper, only the metal pattern remains on a substrate.

At this time, a semiconductor layer, an insulation layer or other conductive layers instead of the metal layer may be etched.

However, the related art fine-pattern formation method using the photoresist has the following disadvantages.

First, the process becomes complicated due to the resist coating, the soft and hard baking for the coated resist, and the exposure and development.

Also, the fabrication cost is increased. In general, the process for the electric device including a plurality of patterns (or electrodes) is provided with a first photoresist step to form one pattern and a second photoresist step to form another pattern. This means that the expensive resist process line is required between each of the pattern lines. Thus, the fabrication cost for the electric device is increased.

Third, it may cause environmental contamination. Since the resist coating is generally performed by spin coating, the amount of resist disused on the coating process is increased, whereby it may cause the environmental contamination as well as the increasing fabrication cost.

Fourth, there are the defective devices. When forming a resist layer by the spin coating, it is difficult to control the precise thickness of resist layer. Accordingly, the thickness of resist layer is not uniform so that un-stripped resist portions remain on the surface of the pattern formed, thereby causing the defective devices.

In order to overcome the problems of the above-mentioned patterning method using photolithography, a new patterning method using an In-Plane soft mold will be explained as follows.

First, a master is prepared so as to obtain a predetermined shape in a surface of a soft mold by an embossing or depressed pattern.

For example, a primary layer is formed by depositing an insulation material such as silicon nitride $Si_3N_4$ or silicon oxide $SiO_2$ on an insulation substrate such as silicon substrate. Then, a photolithography process is applied to the primary layer, whereby the primary layer is formed as a desired pattern.

At this time, the above-mentioned pattern of the insulation substrate may be formed of metal, photoresist or wax as well as silicon nitride or silicon oxide. Through the above-mentioned process, the master is completed.

On completion of the master, a pre-polymer layer is formed on the master.

Then, the pre-polymer layer is cured.

Next, the cured pre-polymer layer is referred to as a soft mold. As the soft mold is stripped off from the master, the embossing and depressed pattern is formed in the surface of the soft mold.

The soft mold is used to form a micro-unit fine pattern (pattern formed by the embossing or depressed shape of the soft mold). For example, the soft mold may be used for a color filter of a color filter substrate or an electrode of an OLED device.

The soft mold may be fabricated by curing an elastic polymer, for example, PDMS (polydimethylsiloxane).

The soft mold may be applied to various fields of soft lithography, soft molding, capillary force lithography and In-Plane printing.

If using the soft mold of PDMS, the modulus of mold is below 5 Mpa. In this case, even though the thickness of mold coated is thin, it is possible to obtain the conformal contact capacity. This soft mold may react on the material layer being in contact, whereby the reliability of mold is lowered. In order to prevent the reliability of mold from being lowered, a hard type material having a high hardness is used for the mold.

Hereinafter, a patterning method using a related art mold will be described with reference to the accompanying drawings.

FIG. 1A is a cross section view of illustrating a patterning method using a mold structure according to the related art. FIG. 1B is a plane view of illustrating a pattern shrinkage generated when forming a pattern by a related art mold.

As shown in FIG. 1A, for example, a mold 20 having embossing and depressed shapes formed in its surface is brought into contact with a pattern-formation layer 14, whereby predetermined patterns corresponding to the embossing and depressed shapes of the mold 20 are formed in the pattern-formation layer 14.

In FIG. 1A, a light-shielding layer 11, red, green and blue color filter layers 12a, 12b and 12c, and an overcoat layer 13 are formed on a substrate 10. Thereon, the pattern-formation layer 14 is coated to form column spacers. In this case, after the pattern-formation layer 14 is brought into contact with the mold 20, they are cured so that the column spacers (not shown) are formed in the pattern-formation layer 14 by the depressed shape of the mold 20.

However, if the mold 20 is in the hard type, the mold 20 is not elastic due to its property. At this time, if the hard-type mold 20 is brought into contact with the pattern-formation layer 14 which is coated thinly, the depressed shape of the mold 20 is not conformed with the pattern-formation layer 14, whereby the depressed shape of the mold 20 comes off the pattern-formation layer 14. As shown in FIG. 1B, the corners of the pattern-formation layer 14 may shrink inward so that the contact failure may occur.

SUMMARY

Accordingly, embodiments of the present invention is directed to a mold structure, a patterning method and a method of fabricating an LCD device that substantially obviate one or more problems due to limitations and disadvantages of the related art.

A mold structure comprises a mold whose surface is provided with patterns; a backplane for supporting the mold; and a conductive film formed between the backplane and the mold.

At this time, the mold has a modulus of about 10 MPa or more. The mold is formed of polyurethane.

Also, the conductive film may be formed of a transparent or opaque conductive film.

In another aspect, a patterning method comprises preparing a mold structure including a mold whose front surface is provided with patterns, a backplane for supporting the mold, and a conductive film between the backplane and the mold; arranging a substrate coated with a material layer in opposite to the mold structure; generating an electric field between the mold structure and the material layer; forming a pattern based on the patterns of the mold structure in the material layer by using the electric field; and separating the mold structure from the patterned material layer.

At this time, generating the electric field between the mold structure and the material layer may comprise applying a first voltage to a stage on which the substrate is loaded; and applying a second voltage to the conductive film.

In addition, the patterning method may include curing the pattern when forming the pattern.

At this time, the conductive film may be formed of a transparent or opaque conductive film.

In another aspect, a method of fabricating an LCD device comprises preparing first and second substrates, each defined with red, green, blue and white sub-pixels arranged regularly; forming a light-shielding layer on the other portions except the sub-pixels of the first substrate; forming red, green and blue color filter layers in the respective red, green and blue sub-pixels of the first substrate; forming a material layer on the first substrate including the light-shielding layer and the red, green and blue color filter layers; forming a white color filter layer in the white sub-pixel, an overcoat layer for planarizing the surface of first substrate, and a column spacer for maintaining a gap between the first and second substrates by patterning the material layer using a mold structure, at the same time; forming a thin film transistor array on the second substrate; and forming a liquid crystal layer between the first and second substrates, wherein patterning the material layer by using the mold structure comprises preparing the mold structure including a mold provided with patterns for forming the column spacer and the white sub-pixel, a backplane for supporting the mold, and a conductive film between the backplane and the mold; positioning the mold structure in opposite to the first substrate loaded onto a stage; generating an electric field between the mold structure and the first substrate; forming the white color filter layer, the overcoat layer, and the column spacer corresponding to the patterns of the mold structure in the material layer by using the electric field, at the same time; and separating the mold structure from the patterned material layer.

Generating the electric field between the mold structure and the material layer may comprise applying a first voltage to the stage; and applying a second voltage to the conductive film.

Patterning the material layer by using the mold structure further may include curing the white color filter layer, the overcoat layer and the column spacer simultaneously when patterning the color filter layer, the overcoat layer and the column spacer at the same time.

In another aspect, a method of fabricating an LCD device, including a first substrate provided with a color filter array, a second substrate provided with a thin film transistor array, and a liquid crystal layer formed between the first and second substrates, wherein forming the second substrate comprises forming a thin film transistor on the second substrate; forming a material layer on the second substrate including the thin film transistor; and patterning the material layer by using a mold structure, so as to form a passivation film to cover the thin film transistor, a contact hole to expose an electrode of the thin film transistor, and a first column spacer to maintain a gap between the first and second substrates, wherein patterning the material layer by using the mold structure comprises preparing a mold structure including a mold provided with pattern for forming the contact hole, the first column spacer, and the passivation film, a backplane for supporting the mold, and a conductive film between the backplane and the mold; positioning the mold structure in opposite to the second substrate loaded onto a stage; generating an electric field between the mold structure and the second substrate; forming the contact hole, the passivation film and the first column spacer corresponding to the patterns of the mold structure in the material layer by using the electric field, at the same time; and separating the mold structure from the patterned material layer.

Also, generating the electric field between the mold structure and the material layer may comprise applying a first voltage to the stage; and applying a second voltage to the conductive film.

Patterning the material layer by using the mold structure may further include curing material layer simultaneously when patterning the contact hole, the passivation film and the first column spacer.

Also, patterning the material layer by using the mold structure may include forming a second column spacer whose height is different from that of the first column spacer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7A to 7C are cross section views of illustrating a fabrication method of a thin film transistor in a method of fabricating an LCD device using a mold structure according to another preferred embodiment of the present disclosure.

DETAILED DESCRIPTION OF THE DISCLOSURE

Reference will now be made in detail to exemplary embodiments of the present invention, which are illustrated in the accompanying drawings. Wherever possible, the same reference numbers will be used throughout the drawings to refer to the same or like parts.

Hereinafter, a mold structure according to the preferred embodiment of the present disclosure, a patterning method using the same and a method of fabricating an LCD device using the same will be described with reference to the accompanying drawings.

Figure 1A:
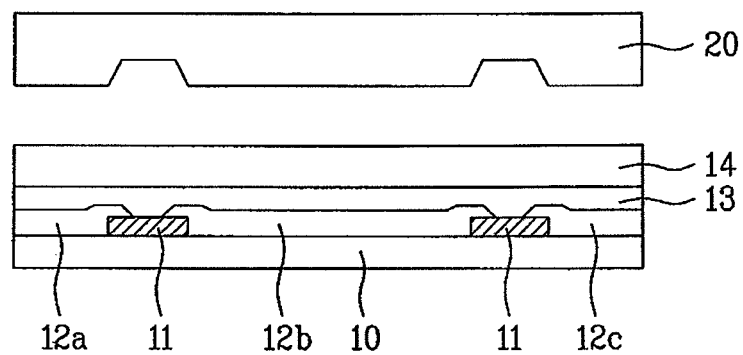
FIG. 1A is a cross section view of illustrating a patterning method using a mold structure according to the related art.
Figure 1B:
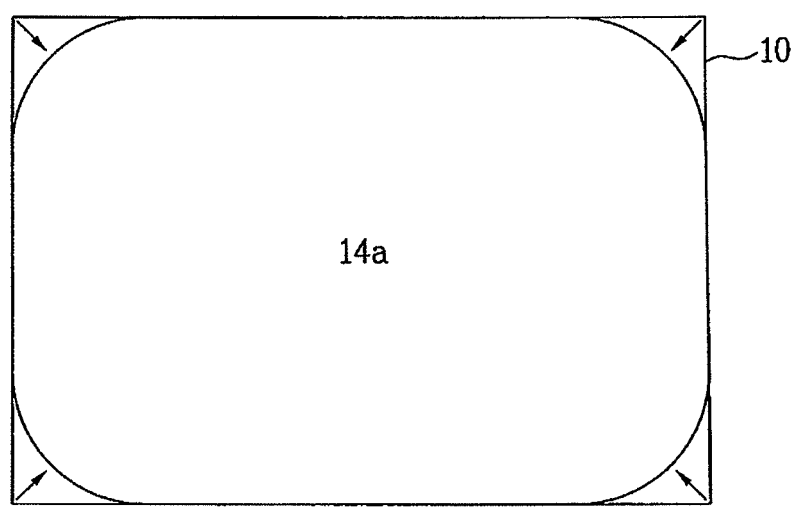
FIG. 1B is a plane view of illustrating a pattern shrinkage generated when forming a pattern by a mold according to the related art.
Figure 2A:
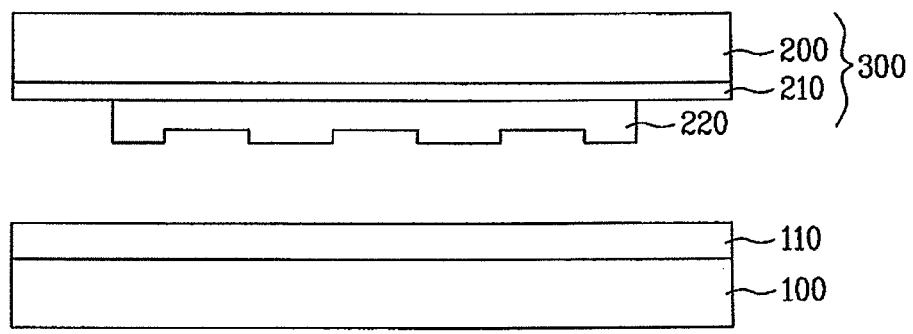
FIGS. 2A to 2C are cross section views of illustrating a mold structure according to the present disclosure and a patterning method using the same.
Figure 2B:
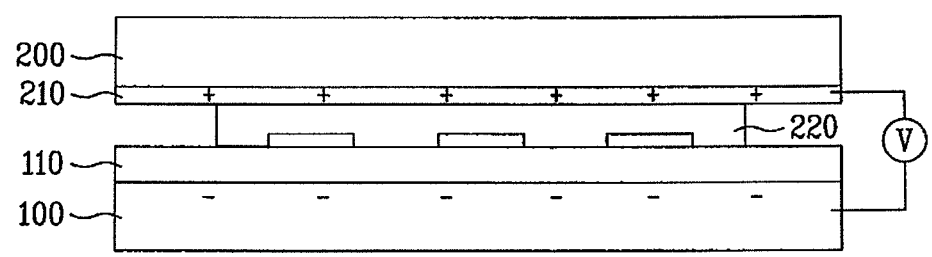
Figure 2C:
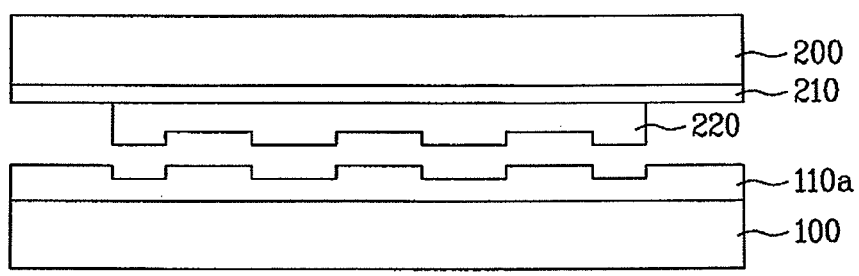
Figure 3:
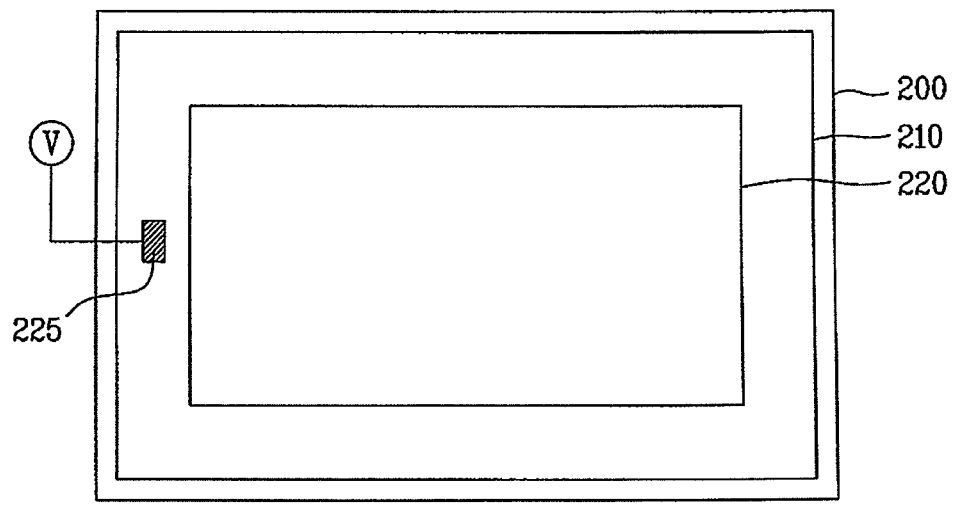
FIG. 3 is a plane view of illustrating a mold structure according to the present disclosure.

FIGS. 2A to 2C are cross section views of illustrating a patterning method using a mold structure according to the preferred embodiment of the present disclosure. FIG. 3 is a plane view of illustrating a mold structure according to the present disclosure.

As shown in FIG. 2A, a mold structure 300 for patterning is comprised of a mold 220 provided with patterns; a backplane 200 formed on a rear surface of the mold 220, wherein the backplane 200 is larger than the mold 220 in size so as to allow the mold 220 to mount thereon; a conductive film 210 formed on a surface of the backplane and adhered to the rear surface of the mold 220; and a voltage-applying pad (225 of FIG. 3) formed at one side of the conductive film 210 on the rear surface of the mold 220.

At this time, the mold 220 is formed in a hard type which has relatively high hardness. That is, the mold 220 is formed of a material whose modulus is above about 10 MPa, for example, polyurethane.

The backplane 200 supporting the mold 220 may be formed of a glass or plastic substrate. On the process to form the pattern using the mold structure 300, if UV rays are incident on the backplane 200, the backplane 200 is formed of a transparent material which enables the incidence and transmittance of light.

The conductive film 210 may be formed of a transparent conductive film or an opaque conductive film. If a material layer 110 is formed of UV-curable liquid pre-polymer, it is preferable to form the transparent conductive film. Generally, the UV-curable liquid pre-polymer is formed of UV-curable acrylate pre-polymer, for example, HEA(2-Hydroxyehyl acrylate), EGDMA(Ethylene glycol dimethacrylate), EGPEA(Ethylene glycol phenyletheracrylate), HPA(Hydroxypropyl acrylate), or HPPA(Hydroxy phenoxypropyl acrylate).

If the material layer 110 is formed of thermo-curable liquid pre-polymer, it allows the conductive film 210 to be transparent or opaque. For example, if the conductive film 210 is formed of the transparent conductive film, the conductive film 210 may be made of any one of ITO (Indium Tin Oxide), IZO (Indium Zinc Oxide) or ITZO (Indium Tin Zinc Oxide). If the conductive film 210 is formed of the opaque conductive film, the conductive film 210 includes conductive polymer such as PEDOT (Poly 3,4-ethylenedioxythophene) or polyaniline. At this time, the conductive film 210 is formed at a thickness between about 10 nm and 100 nm.

Referring to FIG. 3, the conductive film 210 may be the same as or smaller than the backplane 200 in size. In any case, the conductive film 210 is larger than the mold 220 at least. Thus, the voltage-applying pad 225 is positioned at one side of the predetermined portion of the conductive film 210 which is outwardly more jutting than the mold 220.

Then, the mold structure 300 is positioned in opposite to the substrate 10 coated with the material layer 110 such as the UV-curable or thermo-curable liquid pre-polymer.

As shown in FIG. 2B, the voltage is applied between the material layer 110 and the mold structure 300 having patterns. According as the surface of the mold 220 is brought into contact with the material layer 110, predetermined patterns 110a based on the patterns of the mold 220 are formed in the material layer 110.

At this time, the voltage application between the mold structure 300 and the material layer 110 is performed by applying an electric signal to each of the voltage-applying pads included in the mold structure 300 and the substrate 100 through the conductive film 210. In another method, the rear surface of the substrate 100 having no voltage-applying pad is grounded and the constant voltage is applied only to the conductive film 210 of the mold structure 300, so as to realize the aforementioned voltage application. On the virtual process line for fabrication, the voltage-applying pad is not formed at the substrate 100. Thus, the voltage is applied to a stage (not shown) onto which the substrate 100 is loaded, an electric field is generated between the mold structure 300 and the material layer 110.

After applying the voltage between the mold structure 300 and the material layer 110, a pressure (P) is formed between the mold structure 300 and the material layer 110 by the electrostatic effect, and the pressure (P) is in proportion to the square of dielectric constant ($e_r$) of the material layer 110; is in proportion to the application voltage (V) between the material layer 110 and the mold structure 300; and is in inverse proportion to the distance (d) between the rear surface of the mold structure and the substrate, that is, $P \propto V(e_r)^2/d$. Accordingly, it is possible to prevent the small gap between the material layer 110 and the surface of the mold structure 300, and to prevent the pattern shrinkage, thereby enabling the conformal contact. Thus, the patterns 110a are formed without defects.

In consideration of the conditions of pressure ($P \propto V(e_r)^2/d$), the patterning method of the present disclosure satisfies the following conditions.

First, the dielectric constant ($e_r$) of the material layer 110 is above 3, and the material layer 110 is formed of the liquid pre-polymer. Second, the mold 220 has a thickness of 50 μm or less to maintain the small 'd'.

At this time, after the surface of the mold 220 is brought into contact with the material layer 110, the pattern 110a is cured, whereby the pattern 110a is maintained. This curing may be performed by UV rays or heat on the basis of the curing properties of the material layer 110, or this curing may be performed by both UV rays and heat.

As shown in FIG. 2C, after forming the pattern 110a corresponding to the patterns of the mold 220, the mold structure 300 is separated from the surface of the pattern 110a.

Hereinafter, a method of fabricating an LCD device using the aforementioned mold structure will be described with reference to the accompanying drawings.

Figure 4:
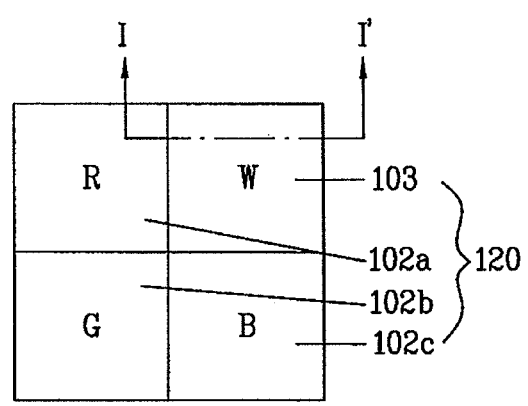
FIG. 4 is a plane view of illustrating one pixel of an LCD device using a patterning method according to the present disclosure.
Figure 5A:
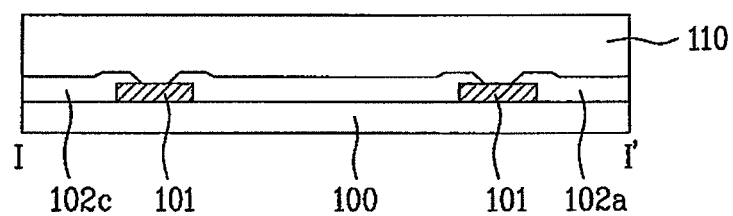
FIGS. 5A to 5C are cross section views of illustrating a method of fabricating an LCD device according to the present disclosure.
Figure 5B:
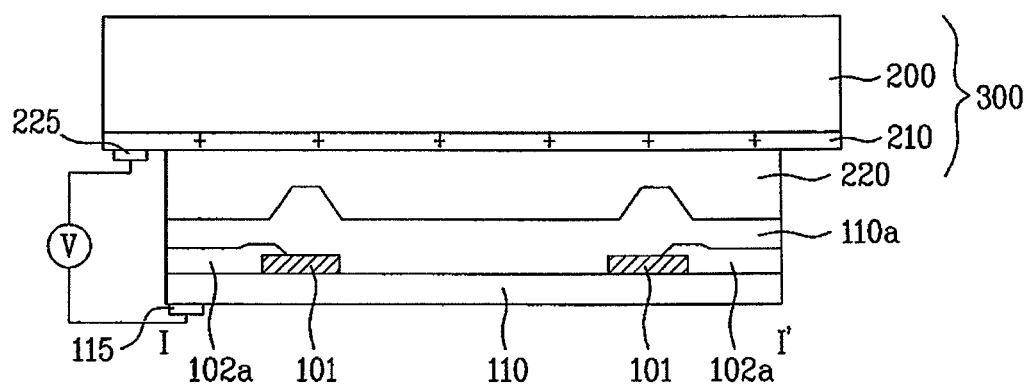
Figure 5C:
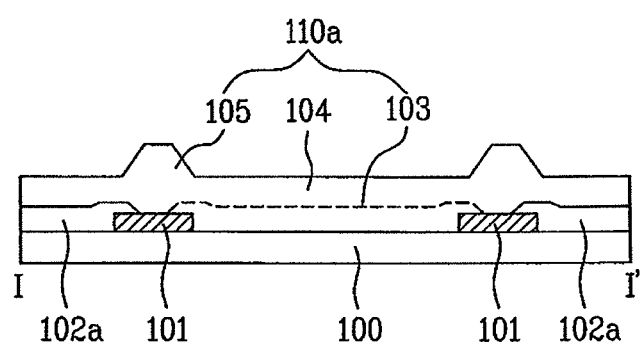

FIG. 4 is a plane view of illustrating one pixel of an LCD device using a patterning method according to the present disclosure. FIGS. 5A to 5C are cross section views of illustrating a method of fabricating an LCD device according to the present disclosure.

As shown in FIG. 4, the LCD device according to the present disclosure comprises a first substrate (100 of FIG. 5A) of a color filter array provided with a plurality of pixels, wherein each pixel is comprised of red(R), green(G), blue(B) and white(W) sub-pixels which respectively include red, green, blue and white color filter layers 102a, 102b, 102c and 103. For convenience of explanation, the red, green, blue and white color filter layers 102a, 102b, 102c and 103 are referred to as a color filter layer 120.

As shown in FIG. 5A, light-shielding layers 101 are formed in the boundaries of the respective sub-pixels on the first substrate 100 having the R, G, B and W sub-pixels defined therein. At this time, the light-shielding layers 101, which are formed in the boundaries of the sub-pixels, are positioned in correspondence with a gate line, a data line and a thin film transistor formed on a second substrate (not shown) having a thin film transistor array in opposite to the first substrate 100.

Subsequently, red, green and blue color filters 102a, 102b and 102c are respectively formed in the red, green and blue sub-pixels on the first substrate 100.

Then, a material layer 110 of liquid pre-polymer is coated on an entire surface of the first substrate 100 including the light-shielding layer 101, and the red, green and blue color filter layers 102a, 102b and 102c.

The liquid pre-polymer for the material layer 110 is comprised of UV-curable or thermo-curable components. Also, the liquid pre-polymer which has the higher viscosity than the general polymer is brought into contact with the surface of the mold 220, whereby the liquid pre-polymer is transformed based on the patterns of the mold 220.

As shown in FIG. 5B, the mold structure 300 of FIG. 2A is in contact with the material layer 110. As the voltage is applied to the conductive film 210 above the mold 220 and the voltage-applying pads 225 and 115 formed in the substrate 100 under the material layer 110, the pattern 110a is formed based on the patterns of the mold 220.

For the process of forming the pattern 110a by contacting the mold structure 300 with the material layer 110, the material layer 110 is cured by applying light or heat thereto.

As shown in FIG. 5C, the mold structure 300 is separated from the pattern 110a. At this time, the pattern 110a is comprised of the white color filter layer 103 in the white sub-pixel; an overcoat layer 104 having a flat upper surface on an entire surface of the first substrate 100 including the light-shielding layer 101 and the red, green, blue and white color filter layers 102a, 102b, 102c and 103; and a column spacer 105 on the overcoat layer 104 above the light-shielding layer 101.

Although not shown, a thin film transistor array is formed on the second substrate, wherein the thin film transistor array is positioned in opposite to the color filter array formed by the aforementioned method.

At this time, the thin film transistor array is comprised of the gate and data lines being orthogonal in the boundaries of the respective sub-pixels; the thin film transistor formed adjacent to the crossing portion of the gate and data lines; and a pixel electrode formed in each of the sub-pixels. According to circumstances, the pixel electrode and a common electrode are alternately formed in the sub-pixels.

Then, a liquid crystal layer is formed between the first substrate of the color filter array and the second substrate of the thin film transistor array. At this time, the liquid crystal layer may be formed by a liquid crystal dispensing method or a liquid crystal injection method. In case of the liquid crystal dispensing method, a sealant having no inlet is formed in any one of the first and second substrates, and then liquid crystal is dispensed onto the substrate provided with the sealant. In case of the liquid crystal injection method, a sealant having an inlet is formed in any one of the first and second substrates, and the first and second substrates are bonded to each other, and then liquid crystal is injected into a space between the first and second substrates through the inlet by capillary and pressure difference.

If using a material having a dielectric constant ($e_r$) of about 3 so as to induce the pressure of 1 atmosphere, it necessarily requires the distance (d) of 100 μm between the conductive film (210 of FIG. 5B) and the substrate, and the electric field of about $5*10^5$ V/cm. In case of a silicon oxide, the breakdown field is $10^7$ V/cm, so that the patterning is performed without the breakdown of properties even though a predetermined film is formed on the substrate 100 below the material layer 110.

In case of the method of fabricating the LCD device according to the present disclosure, the material layer 110 has a dielectric constant between 3.5 and 7; and the mold 220 has a thickness between 10 μm and 50 μm, which satisfy the aforementioned conditions in relation with the pressurization.

Especially, in case of the method of fabricating the LCD device according to the present disclosure, when an ONC (overcoat and column spacer) material common to the overcoat layer and the column spacer is thin, and the mold structure for formation of the pattern is in the hard type, the ONC material may be insufficiently filled in the depressed portion of the mold structure or the ONC material may be shrunk, thereby causing the contact failure in the circumference.

In case of the patterning method according to the present disclosure, when forming the electric field between the mold structure and the ONC material, the pressure is applied thereto, thereby improving the conformal contact therebetween. Accordingly, there is no requirement for the additional UV imprinting process to apply the pressure to the circumference, thereby preventing inducement of blots.

The patterning method of the present disclosure may be applicable to the white color filter layer of the aforementioned LCD device, the unified structure of the overcoat layer and the column spacer, the light-shielding layer or the other color filter layers. Also, the patterning method of the present disclosure may be applicable to a light-emitting layer of an OLED device.

The aforementioned mold structure, the patterning method using the same, and the method of fabricating the LCD device have the following advantages.

In the process of forming the white color filter layer and forming the overcoat layer and the column spacer at the same time by the In-Plane printing process which is one of non-exposure processes to substitute for the related art exposure process, it is possible to prevent the contact failure which may occur in the contact between the mold and the substrate, thereby realizing the reliability of process.

Instead of the aforementioned mold structure to form the overcoat layer and the column spacer together, another structure for forming a thin film transistor array has been proposed.

Figure 6:
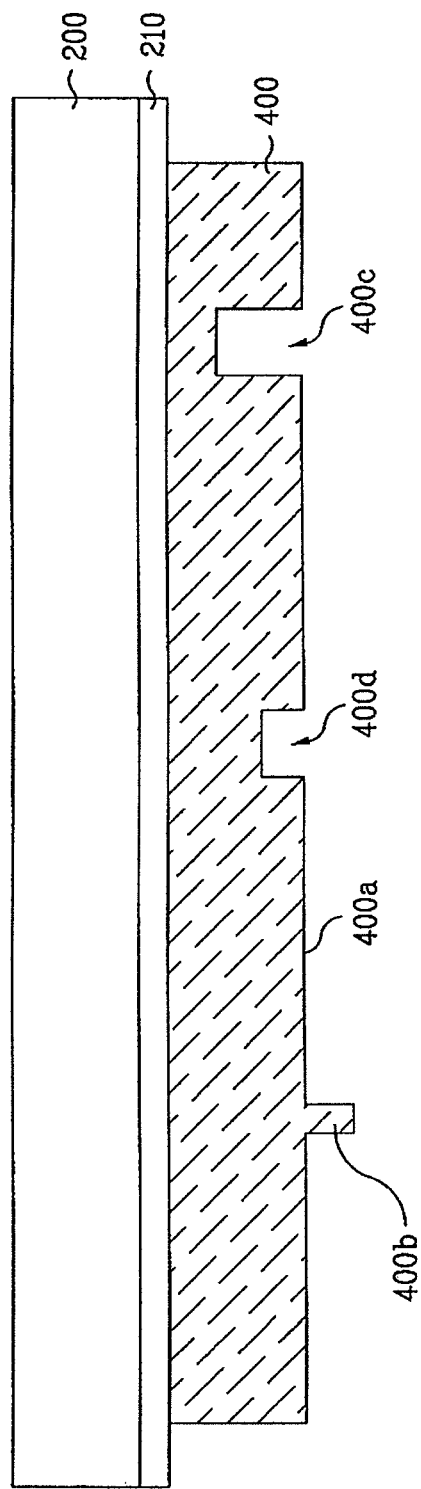
FIG. 6 is a cross section view of illustrating a mold in a mold structure according to another preferred embodiment of the present disclosure.

FIG. 6 is a cross section view of illustrating a mold in a mold structure according to another preferred embodiment of the present disclosure. As shown in FIG. 6, a mold 400 is provided with patterns to form a passivation film for covering a thin film transistor; a contact hole for exposing an electrode of the thin film transistor; and a column spacer for maintaining a gap between first and second substrates, together.

The patterns of the mold 400 includes an embossing portion 400b, at least one depressed portion 400c and 400d, and a flat portion 400a to form the passivation film, the contact hole and at least one column spacer in the thin film transistor array. This mold 400 is positioned on a backplane 200 with a conductive film 210 interposed therebetween.

Figure 7C:
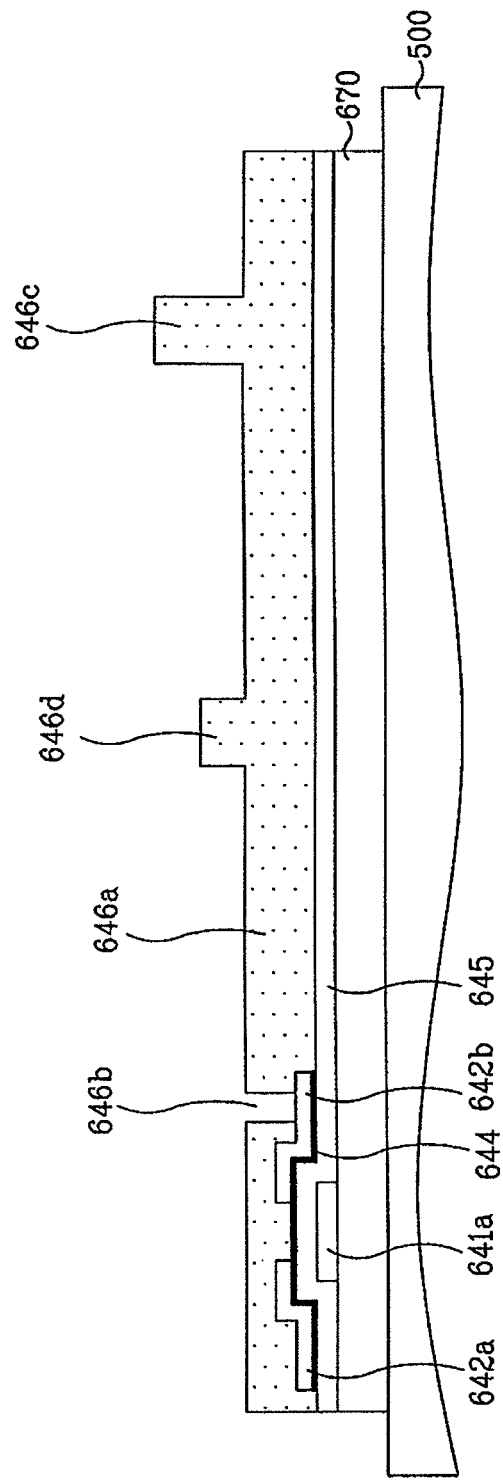

FIGS. 7A to 7C are cross section views of illustrating a fabrication method of a thin film transistor in a method of fabricating an LCD device using a mold structure according to another preferred embodiment of the present disclosure.

First, as shown in FIG. 7A, a thin film transistor is formed on a second substrate 670 loaded on a stage 500. Forming the thin film transistor is comprised of forming a gate electrode 641 a by forming and patterning a gate metal layer on the second substrate 670; forming a gate insulation film 645 on the second substrate 670 including gate electrodes 641a; forming a semiconductor layer 644 by forming a silicon layer on the second substrate 670 including the gate insulation film 645 and patterning the silicon layer by photolithography; and forming source and drain electrodes 642a and 642b by forming source and drain metal layers on the second substrate 670 including the semiconductor layer 644 and patterning the source and drain metal layers by photolithography. At this time, the semiconductor layer 644 may be formed in a dual-layered structure of an active layer and an ohmic contact layer.

Then, a material layer 646 is formed on the second substrate 670 including the source and drain electrodes 642a and 642b. At the time, the material layer 646 may be formed of UV-curable or thermo-curable liquid pre-polymer which is identical to that of the aforementioned embodiment.

When positioning the mold structure, provided with the mold 400 including the flat portion 400a, the embossing portion 400b and at least one depressed portion 400c and 400d, on the backplane 200 with the conductive film 210 interposed therebetween, the mold structure faces the second substrate 670 including the material layer 646.

As shown in FIG. 7B, after aligning the second substrate 670 including the mold 400 and the material layer 646, the voltage is applied to the stage 500 and the conductive film 210 of the mold structure. Simultaneously, an electric field is generated between the mold structure and the material layer 646, and the mold 400 is brought into contact with the material layer 646, whereby the material layer 646 is patterned by using the mold structure. Accordingly, the passivation layer, the contact hole and at least one column spacer, which respectively corresponds to the flat portion 400a, the embossing portion 400b, and at lest one depressed portion 400c and 400d, are formed in the material layer 646 at the same time. On patterning the passivation layer, the contact hole, and the column spacer, they are simultaneously cured by UV or heat.

Then, after stopping the supply of voltage applied to the stage 500 and the conductive film 210 of the mold structure, the mold structure is separated from the material layer 646. As shown in FIG. 7C, the passivation layer 646a including the contact hole 646b and at least one column spacer 646c and 646d are formed on the second substrate 670.

At least one column spacer 646c and 646d may be provided with the first column spacer for maintaining a cell gap between the second substrate 670 and first substrate (not shown), and the second column spacer provided with a pre-determined interval from the first substrate to prevent a surface of the substrate from being kept down by pressing.

Each of the first and second column spacers 646c and 646d overlaps with a gate line (not shown) connected with the gate electrode 641 a. In this case, the first and second column spacer 646c and 646d have the different heights. Furthermore, the first column spacer 646c overlaps with a channel region of the thin film transistor, and the second column spacer 636d overlaps with the gate line. In this case, the first and second column spacers 646c and 646d may have the same height, or the different heights. The second column spacer 646d may be removed from the substrate.

According as the conductive film is formed on the passivation layer 646a including the contact hole 646b, and is then patterned by photolithography, a pixel electrode (not shown) is formed in connection with a drain electrode 642b.

The mold structure according to another preferred embodiment of the present disclosure, the patterning method using the same, and the method of fabricating the LCD device having the same can simplify the process for the thin film transistor array, and decrease the fabrication cost for the thin film transistor array by forming the passivation film 646a, the contact hole 646b and at least one column spacer 646c and 646d at the same time.

It will be apparent to those skilled in the art that various modifications and variations can be made in the embodiments of the present invention without departing from the spirit or scope of the invention. Thus, it is intended that the present invention covers the modifications and variations of the embodiments provided they come within the scope of the appended claims and their equivalents.

What is claimed is:

1. A mold structure comprising:
   a mold having patterns configured to form a column spacer, a white color filter, an overcoat layer and one or more via holes through a pattern material on a substrate to form one or more contact holes with one or more electrodes on the substrate, the patterns including at least one recess having a shape corresponding to a shape of the column spacer and at least one protrusion having a shape corresponding to a shape of the one or more contact holes, wherein the column spacer and the one or more contact hoes are embossed on the pattern material;

a backplane formed on a rear surface of the mold, wherein the backplane is larger than the mold in size so as to allow the mold to mount thereon;

a conductive film formed on a surface of the backplane and adhered to the rear surface of the mold;

wherein the substrate coated with the pattern material layer is disposed in opposite to the mold to be patterned by the mold and wherein the size of the substrate is same to that of the mold;

wherein the rear surface of the substrate having no voltage applying pad is grounded and the constant voltage is applied only to the conductive film of the mold structure and to a stage;

wherein the conductive film is comprised of PEDOT (Poly 3,4-ethylenedioxythophene) or polyaniline; and wherein the pattern material layer has a dielectric constant ($e_r$) between 3.5~7 and the mold has a thickness of 10~50 μm to maintain a distance(d) between the rear surface of the mold and the rear surface of the substrate, in consideration of the relation: $P \propto V(e_r)^2/d$, wherein P is a pressure between the mold and the pattern material layer, V is the constant voltage applied between the conductive film and the rear surface of the substrate.

2. The mold structure of claim 1, wherein the mold has a modulus of about 10 MPa or more.

3. The mold structure of claim 2, wherein the mold is formed of polyurethane.

* * * * *